May 11, 1965   W. J. GIBSON   3,182,490
TUBE FOLLOWER AND SEARCH TUBE MOUNTING DEVICE
Filed Oct. 1, 1962   3 Sheets-Sheet 1

INVENTOR.
Walter J. Gibson
BY
ATTORNEY

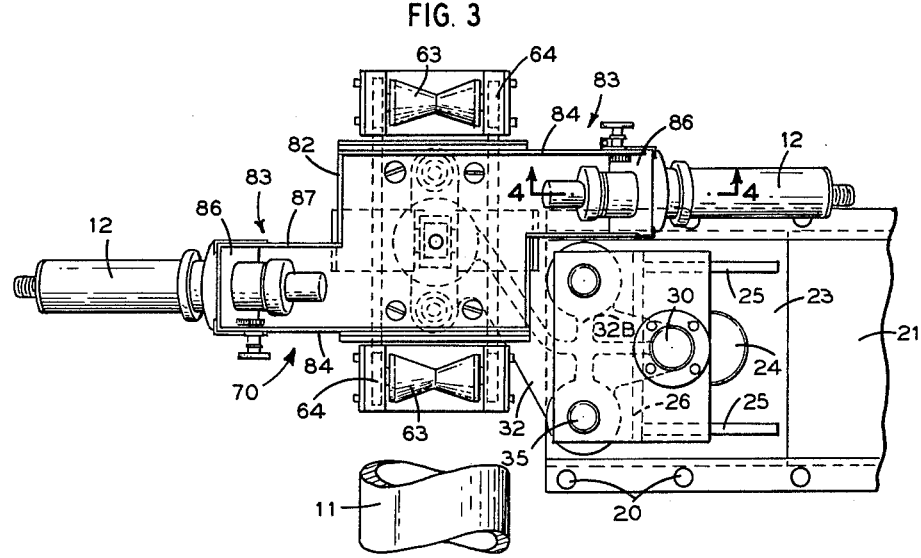
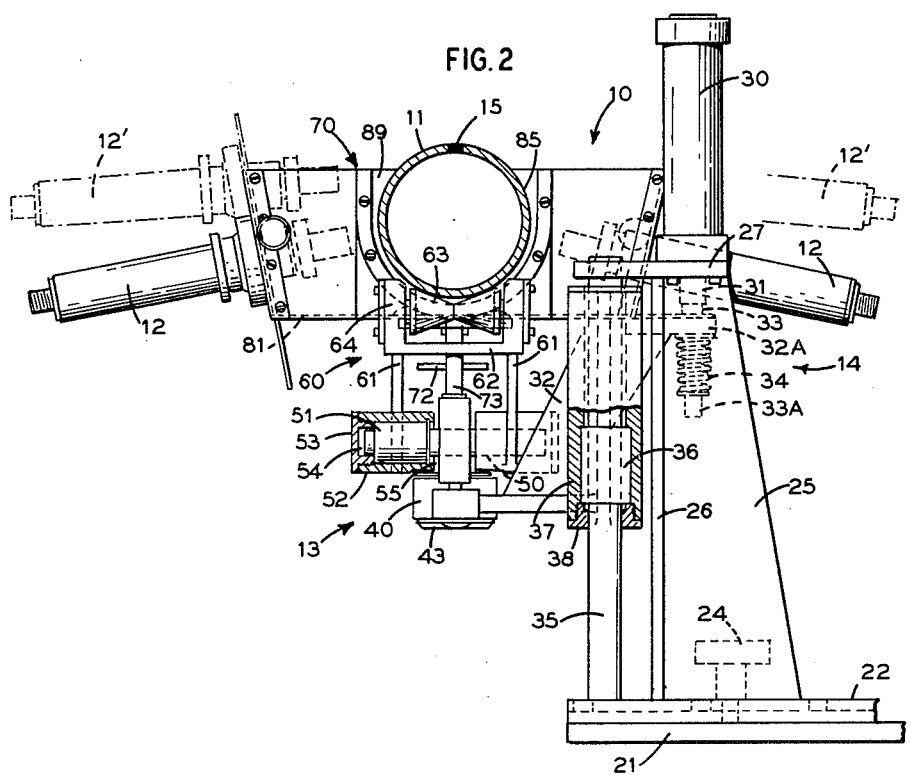

United States Patent Office 3,182,490
Patented May 11, 1965

3,182,490
TUBE FOLLOWER AND SEARCH TUBE
MOUNTING DEVICE
Walter J. Gibson, Alliance, Ohio, assignor to The Babcock
& Wilcox Company, New York, N.Y., a corporation of
New Jersey
Filed Oct. 1, 1962, Ser. No. 227,159
4 Claims. (Cl. 73—67.8)

This application refers to the ultrasonic inspection of longitudinally extending members, and more particularly refers to an apparatus for positioning, adjusting and holding a transducer of an ultrasonic flaw detection system in constant angular relationship with respect to a rapidly advancing, longitudinally extending workpiece that is subject to deviations from strict axial travel.

Ultrasonic inspection systems have recently been adapted for detecting the presence of flaws or defects in longitudinally extending workpieces. This method of inspection has become widely accepted for application in the manufacture of seam welded tubing, where the inspection system can be integrated with the tube forming and welding mill. In these mills, the tubing is formed at a rate of 80–120 ft. per minute, and by integrating inspection with the high speed production, uniform quality control of manufacture is assured, the handling of the product is minimized and the cost of the finished, inspected product is thereby reduced as compared to that of a substantially comparable quality product as heretofore produced.

The adequacy and reliability of inspection of this type has rapidly improved in the last several years; moreover, the improvement involved the surmounting of several major obstacles. The first major problem to be overcome was that of reducing the rate of wear of the transducer vibrating elements that had to be maintained in contact with the tube or other workpiece. It was soon found that by interposing a liquid between the workpiece and the transducer vibrating element the ultrasonic energy waves could be transmitted to the tubing with only minor attenuation of ultrasonic energy in the course of their transmission through the intermediate fluid. Another problem which plagued the advance of the art was that of maintaining the search units or transducers in the proper angular relationship to a workpiece which was subject to deviations from strict axial travel because of a combination of mechanical forces exerted by the forming rolls, thermal stresses due to the application of welding heat, and variations in the physical properties of the workpiece material. The transducers could not be rigidly fixed adjacent the moving tubular workpiece because the nonaxial movements of the tube caused variations in the angular relationship between the transducers and the tube and thus rendered the inspection unreliable and ineffective. This problem was temporarily overcome by the development of a tube follower device as shown in U.S. Patent No. 3,056,285 issued October 2, 1962 to Gibson et al. This inspection device, when used on a totally submerged portion of the tube, provided a unique arrangement of counter-moving axes which allowed movement of the carriage on which the transducer was mounted so that the transducers substantially followed the nonaxial movements of the workpiece.

The U.S. Patent No. 3,056,285 disclosed a transducer and associated top-mounted follower which permitted the search tube to adapt to the movements of the tube in all directions except in the axial direction. By a unique arrangement of counter-moving shafts which imparted a plurality of movements to a carriage, and by mounting the transducers on the carriage, it was discovered that the consistency of the angular relationship between the transducer and the tube being inspected could be greatly improved. However, the equipment was found to be somewhat cumbersome, and the results not as reliable as desired because of difficulty in maintaining the proper angles between transducers and the workpiece due to the axial displacement of the transducers from the center of movement of the carriage on which they were mounted.

Subsequently, further improvements in ultrasonic testing methods were developed that were more effective than the total immersion system. It was found that by only partially immersing the tube to be tested, a wider test area could be more effectively covered by the transducers. Such a system employing partial submerging of the tubular member being tested is shown in patent of Ots, 2,795,133. Although theoretically a superior testing method, the system as shown by Ots was found to be impractical. The major problem encountered was again that of constantly maintaining the proper angular relationship between the search tubes and the workpiece in spite of axial deviations of the workpiece. To further complicate the situation, it was found that with the interposition of the water surface, the angularity was even more critical with this new system.

Obviously, the follower device of U.S. Patent No. 3,056,285 was not satisfactory since it was top mounted and could not accommodate the face liquid surface of the new system. It should be recognized that the mounting of the transducers under the water level with the carriage on the top of the workpiece would be totally impractical because it would not permit easy disengagement of the follower device from the workpiece. This is considered essential to minimize the risk of damage of the inspection device and possible curtailment of production.

An object of this invention is to provide a readily detachable mechanism for supporting and maintaining transducers of an ultrasonic inspection system in the proper angular relationship with the tube or workpiece being inspected. A further object is to provide apparatus for precisely reproducing in the inspecting transducer the deviations of the member being tested from strict axial travel so that the angular relationship may be continuously maintained. A still further object of this invention is to provide a means by which the initial angular relationship between the workpiece and the transducer can be easily set and locked.

In the present invention, a follower device is provided which is easily detachable from the workpiece and which maintains a transducer of an ultrasonic inspection system in constant angular relationship with respect to a rapidly advancing longitudinally extending workpiece that is subject to deviations from strict axial travel. This is accomplished by providing an underslung carriage having guide rollers which engage the surface of the workpiece, the carriage being arranged so that it may move in any and all the directions necessary to follow the deviations of the workpiece from strict axial movement. The transducer is mounted on a wall of a water-filled receptacle which is affixed to the carriage between the axially displaced rollers, so that the transducers are as close as possible to the center of rotation of the carriage with respect to the tube. By so mounting the transducers, deviations of the tube are precisely transferred to the transducers to effectively maintain constant angularity between the workpiece and the transducer. The transducer is located in the walls of the receptacle in a ball and socket mount in association with a vertically operative rack and pinion so that the transducer, which has its vibrating element submerged in the liquid in the receptacle, and can be easily adjusted and locked in proper position with respect to the workpiece.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:

FIG. 2 is an end view of the follower device having sections thereof broken away;

FIG. 3 is a plan or top view of the follower device;

Figure 1:
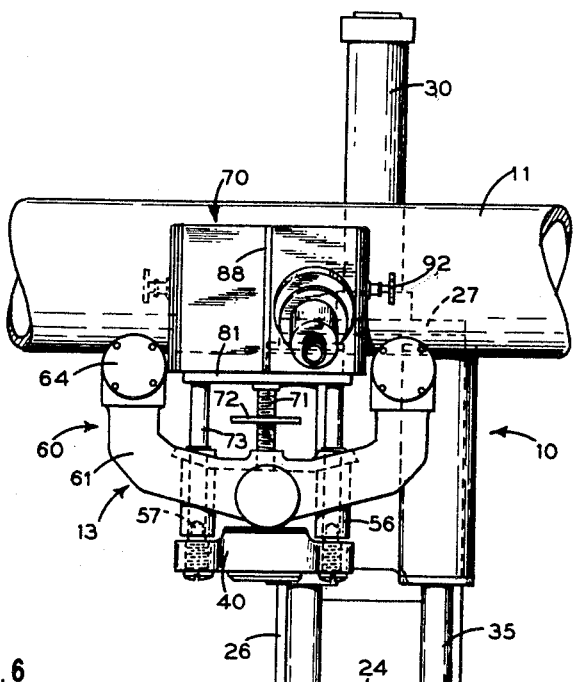
FIG. 1 is a side elevation of the follower device in operative engagement with the workpiece and having sections thereof broken away.

In the drawings, FIGS. 1, 2 and 3, the search tube mounting device or follower 10 is shown in operative engagement with a tubular workpiece or seam-welded tube 11 which is to be inspected and which is longitudinally advancing past the stationary search tube mounting device 10. The invention is herein described as being used for the inspection of the seam of a seam-welded tube 11 having its seam 15 on the top; however, it should be understood that the invention may be applied to the inspection of longitudinal members having other cross-sectional configurations.

The follower 10 may be located at any accessible position along the workpiece forming mill; however, in the case of seam-welded tube forming mills, the most advantageous location is between the last sizing rollers and the straightening rollers (not shown). It has been found that at this point in the progress of the tubing through the forming mill, any existing tubing defects are accentuated by the stresses resulting from the sizing and concomitant elongation of the tube.

The tube 11 is engaged by, and the ultrasonic search tubes or transducers 12 are mounted on, a follower mechanism 13 which is supported from a vertical support assembly 14 which is affixed adjacent the moving tube 11. The vertical support assembly 14 is rigidly attached to a stationary portion 21 of the tube forming mill.

The vertical support assembly 14 is attached to a stationary base 21 by means of bolts 20 which also pass through and connect the guide bars 22 to the base 21. The guide bars 22 are formed with recesses to accommodate and engage the bottom mounting plate 23 so that it may be slidably adjusted toward and away from the tube 11. A hand tightened lock 24 is threaded through the bottom mounting plate 23 so that it can be held in position by turning the lock 24 until it engages the base 21. A pair of parallel, vertical support webs 25 and an interconnecting perpendicular plate member 26 are welded to the bottom mounting plate 23 to form the main vertical support member of the vertical support assembly 14. A horizontally disposed top plate 27 is welded to the top of the support webs 25 and the plate member 26. An air cylinder 30 is mounted vertically on top of the top plate 27, and the piston rod 31, which is connected to an internal piston (not shown) of the air cylinder 30, extends from the bottom of the air cylinder downwardly through the top plate 27. As shown in FIG. 2 the cantilever web member 32, which supports the follower mechanism 13, is attached to the lower end of the piston rod 31 by a bolt 33. A spring 34 is disposed between the bolt head 33A and the connected portion 32A of the cantilever web member 32 to afford vertical resilience between the connection of the cantilever web member 32 and the piston rod 31. A pair of vertical guide rods 35 are aligned parallel to the direction of movement of the tube 11 and are interconnected between the top plate 27 and the bottom mounting plate 23. Tubular bearings 36 engage the machined guide rods 35, and are held in the bearing housings 37 by the nut and seal assemblies 38. The bearing housings 37 are rigidly affixed to the cantilever web member 32 by webs 32B. Thus it can be seen that the cantilever web member 32 can be afforded vertical movement by actuation of the air cylinder 30, and the movement thus imparted is restricted to the vertical direction by the engagement of the tubular bearings 36 on the guide rods 35. In addition, it can be seen that resilience is afforded the cantilever web member 32 relative to the vertical support assembly 14 by the spring 34.

From the foregoing it will be observed that the follower mechanism 13 can be raised or lowered into or out of operative engagement with the tube 11 by actuation of the double acting air cylinder 30. When the tube mill is not in operation, for example when it is being "threaded," the follower mechanism 13 can be lowered out of the way by downwardly displacing the piston rod 31 of the air cylinder 30. When the follower mechanism 13 is to be engaged with the tube 11 in operative position, the piston rod 31 is raised by actuation of the air cylinder 30, the air being supplied from a source not shown. Upon engagement of the follower mechanism 13 with the tube 11, the piston rod 31 is further raised to partially compress the spring 34 to afford vertical resilience to the mounting of the follower mechanism 13.

Figure 6:
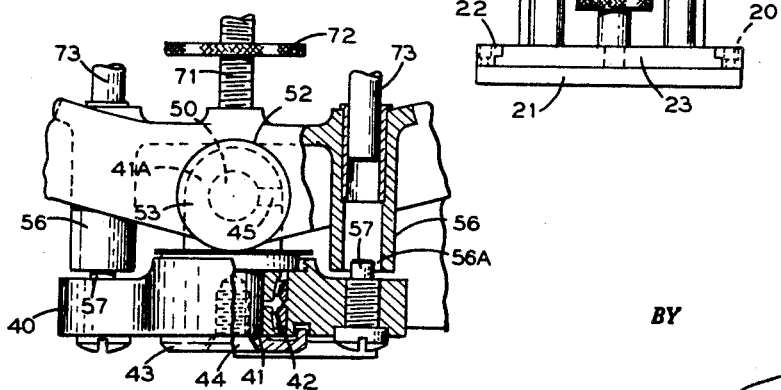
FIG. 6 is an enlarged portion of FIG. 1.

The entire tube follower mechanism 13 is supported by the cantilever web member 32, which connects to the bottom bearing housing 40. As shown in FIG. 6, a stub support shaft 41, the centerline of which is in alignment with the vertical axial or centerline of the tubing 11, extends vertically upwardly from the housing 40 and is supported by and free to rotate in a roller bearing 42 contained within the housing 40. The bearing 42 is held in place by the bottom retainer plate 43 and connecting bolt 44. The remaining upper portion or carriage 60 of the follower mechanism 13 is supported by the stub shaft 41. Thus it can be seen that the entire carriage 60 is free to rotate about a vertical axis coincident with the stub shaft 41.

The stub shaft 41 has in its upper end 41A an opening for receiving the horizontal shaft 50, which is locked in place by set screw 45. The shaft 50, positioned beneath the tube 11, has its axis perpendicular to the vertical axis of the tube 11 and to the vertical stub shaft 41. Each of the outwardly extending machined ends of the horizontal shaft 50 are fitted with tubular sleeve bearings 51 which are contained in carriage bearing housings 52, see FIG. 2. The bearings 51 are held in place in the housings by end caps 53, which are so designed as to allow a space 54 between the end of the shaft 50 and its respective end cap 53. By providing additional spaces 55 between the inward ends of the bearing housings 52 and the upper portion 41A of the stub shaft 41, the bearing housings with their associated bearings are afforded a limited amount of lateral movement along the horizontal shaft 50, the extent of the movement being defined by the horizontal dimension or width of the smaller of the spaces 54 and 55.

As seen in FIG. 2, the carriage bearing housings 52 are integrally formed as the central portion of the carriage 60 which includes a pair of spaced C-shaped members 61 that are joined together at their upward extremities by cross members 62. Rollers 63, with their associated bearing mounts 64 are disposed on either side of the carriage 60, and engage the underside of the tube 11 at axially displaced positions thereon. The rollers 63 are formed with V-shaped contact surfaces so that positive two-point contact can be effected between each roller and tube 11. It should be recognized that this V-shaped configuration of rollers is adaptable to various sizes of tubes, and also that the roller contact surfaces may be altered for suitably engaging workpieces having shapes other than that of the tubing shown.

From the foregoing description, it can be seen that the C-shaped members 61, together with the other apparatus already described as being attached thereto, and including the integrally formed carriage bearing housings 52 are free to rotate about the horizontal shaft 50.

The carriage 60 also has a pair of axially disposed, downwardly extending, open-ended members 56, as seen in FIG. 6, the lower ends of which have openings 56A fitting over threaded retaining pins 57, which are attached on the upper side of the bottom bearing housing 40. The pins 57 are smaller in diameter than the lower openings 56A in the member 56 so as to afford limited movement of the carriage 60 relative to the pins. To facilitate this relative movement, the members 56 are foreshortened so as not to engage the top surface of the bottom bearing housing 40.

A water receptacle 70, to be described hereinafter and having transducers 12 mounted thereon, is disposed around the major portion of the tube 11 which is being inspected. The receptacle 70 is secured to the carriage 60 through the threaded adjustment shaft 71 which is formed with a turning knob 72 whereby positioning of the receptacle 70 may be vertically adjusted to accommodate various sizes of tubing 11. A pair of axially displaced guide pins 73, attached to the receptacle 70, extend downwardly from the bottom of the receptacle fitting slidably into the open upper ends of the members 56. The sliding fit of the guide pins 73 allows vertical adjustment of the receptacle 70 with respect to the carriage 60, but otherwise prevents relative movement therebetween.

From the above description, it can be seen that the follower 10 is capable of faithfully sensing the exterior profile of each increment of the tube as it is being inspected, thus allowing the deviations of the tube from strict axial travel to be precisely reproduced in the transducers 12, while maintaining the desired constant angularity between them. For example, if the tube 11 should be displaced vertically from axial travel, the follower mechanism 13 will remain in contact with the tube 11 due to the force exerted by the partially compressed spring 34, as previously described. If, on the other hand, the deviation of the tube 11 from strict axial travel should occur as a slight vertical inclination of the tube 11, the carriage 60 will rotate about the horizontal shaft 50. Lateral displacement of the tube may be accommodated by the tubular bearings 51, attached to the carriage 60, sliding laterally along the shaft 50, thus utilizing the aforedescribed clearance spaces 54 and 55. Angular displacement of the tube 11 in a horizontal plane may be followed by the carriage 60 by virtue of its being connected to the rotatable vertical shaft 41. The magnitude of all of these movements is limited by the clearance between the pins 57 and the openings 56A in the downwardly-extending open-ended members 56.

From the foregoing it will be evident that the follower mechanism 13 is afforded limited multi-directional movement to allow the transducers 12, connected to the carriage 60, to follow any reasonably practical deviation of the tube 11 from strict axial travel.

Figure 4:
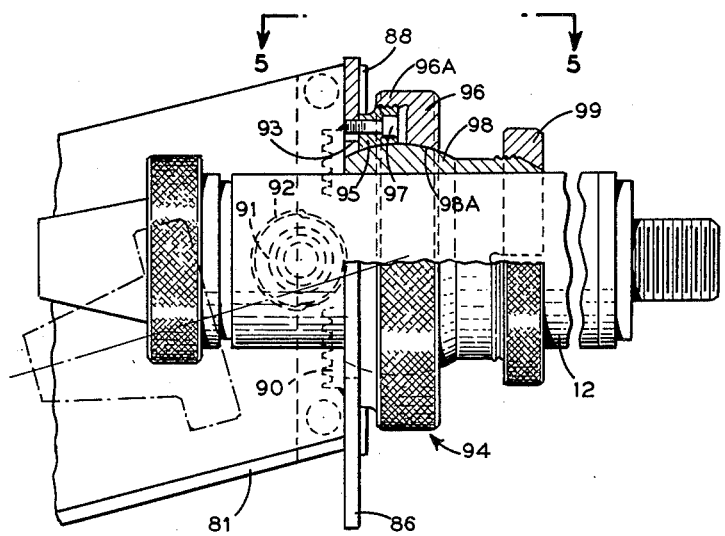
FIG. 4 is a partially sectionalized view of a transducer mount taken along lines 4—4 of FIG. 3.

Referring to FIGS. 2, 3 and 4, the water reservoir 70 includes a bottom plate 81, side plates 82 having formed therein offsets 83 to accommodate the mounting of transducers 12, and end plates 84, which are formed with openings 85 adapted to engage the workpiece, while permitting partial submersion in water of a portion of the length of the tube 11 in accordance with the inspection technique being employed. The openings 85 are supplied with flexible gaskets 89, providing a reasonably tight seal to prevent excess leakage of liquid from the reservoir 70. In operation, the water in the reservoir 70 is kept at the desired level by a water supply line (not shown).

Means are provided in the mounting of the transducers 12 for both vertical and angular adjustment in order to accommodate a range of tube sizes. For example, in FIG. 2, the transducers 12' are shown in phantom in an alternative position. They would, in all probability be used in this position for inspecting tubes of larger diameter than that shown in FIG. 2.

Figure 5:
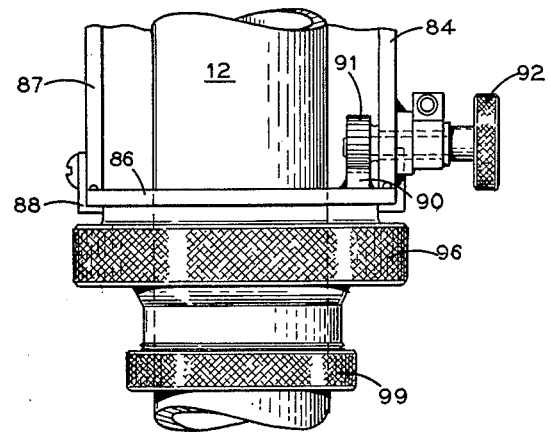
FIG. 5 is a plan view of the transducer mount taken along lines 5—5 of FIG. 4.

As best shown in FIGURES 3, 4 and 5, the transducer 12 is mounted in the offset side plate 86, which is slidably engaged with the receptacle end plate 84 and the offset side wall 87 and is held in place by the angle plate 88. The offset side plate 86 is greater in height than the side wall 87 so that the side plate 86 may be adjusted vertically. This adjustment is effected by a rack 90 and pinion 91 gear set, the rack being attached to the offset side plate 86 and the pinion 91 being engaged with the rack 90 and rotatably mounted in the receptacle end plate 84. By rotating the knob 92 which is attached to the pinion 91, the offset end plate can be vertically adjusted.

The transducer 12 is mounted through an opening 93 in the offset side plate 86 by a ball and socket type joint 94. The ring 95 is attached to the offset side plate 86 by bolts 97. The inner surface of the ring 95 is formed with a concave surface to mate with the convex surface 98A on one end of the locking sleeve 98 which is formed of a resilient material and is disposed around and supports the transducers 12. The locking sleeve is held in contact with the concave surface of the ring 95 by the locking ring 96 which is formed with an external knurled surface and a circumferential lip 96A which has formed on its inside, inner edge threads to mesh with those of the ring 95. Additionally, the innermost surface of the locking ring is concavely shaped to mate with the convex surface 98A of the locking sleeve 98. Thus by engaging the threads of the locking ring 96 with those of the ring 95, the convex surface 98A is engaged and held in position by ring 95 and the locking ring 96. The transducer 12 is attached to the outer end of the locking sleeve 98 by the locking nut 99. The locking nut 99 is formed with a threaded portion and a bevelled portion on its inner surface, and the locking sleeve 98 is formed with external threaded and bevelled portions which mate with the corresponding surfaces on the locking nut 99. The transducer 12 is seized and held in place by engaging the threads and bevel of the locking nut 99 with those of the locking sleeve 98 to inwardly compress the resilient locking sleeve 98 against the transducer 12.

From the above, it can be seen that the angular relationship between the transducer 12 and the tube 11 and their relative vertical positions can be easily adjusted by means of the vertical adjustment knob 92 and ball and socket joint 94. It is also to be noted that the transducer 12 can be axially displaced when the locking nut 99 is released.

While in accordance with the provisions of the statutes the invention has been illustrated and described in the best form and mode of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A device for maintaining a transducer of an ultrasonic flaw detection system in constant angular relationship with respect to a rapidly advancing longitudinal workpiece that is subject to deviations from strict axial travel, said device comprising a carriage arranged to engage the workpiece, means for supporting said carriage while means allowing movement of the carriage so that it follows all the deviations of the workpiece from strict axial travel, said means including a shaft extending transversely of the longitudinal axis of the workpiece, bearing means engaged with said shaft, and means allowing relative axial movement of said shaft and said bearing means to allow movement of the carriage so that it follows lateral deviations of the workpiece from strict axial travel, walls forming a receptacle connected to said carriage and containing a liquid, said walls having means forming openings therein, the edges of said openings being adapted to engage the workpiece and permit partial submersion of a portion of the length of the workpiece, a transducer having a vibrating element submerged in the liquid in the receptacle and directed toward said workpiece to transmit and receive ultrasonic energy waves through said liquid into and out of the submerged portion of the workpiece, and an adjustable mount connected to one of the walls of said receptacle and adapted to hold the transducer at a predetermined angle with respect to the workpiece.

2. A device for maintaining a transducer of an ultrasonic flaw detection system in constant angular relationship with respect to a rapidly advancing longitudinal workpiece that is subject to deviations from strict axial travel, said device comprising a carriage disposed under and arranged to engage and move in accordance with said deviations of the workpiece, means for supporting said carriage while allowing movement of the carriage so that it follows all the deviations of the workpiece from strict axial travel, said means including a shaft extending transversely of the longitudinal axis of the workpiece, bearing means engaged with said shaft, and means allowing relative axial movement of said shaft and said bearing means to allow movement of the carriage so that it follows lateral deviations of the workpiece from strict axial travel, means forming a receptacle connected to said carriage and containing a liquid, said walls having means forming openings therein, the edges of said openings being adapted to engage the workpiece and permit partial submersion of a portion of the length of the workpiece in said liquid, a transducer passing through one of said side walls, means for vertically moving said one of said side walls, said transducer having a vibrating element submerged in the liquid in the receptacle and directed toward said workpiece to transmit and receive ultrasonic energy waves through said liquid into and out of the submerged portion of the workpiece, and an adjustable mount connecting said transducer to said one of said side walls and adapted to hold the transducer at a predetermined angle with respect to the workpiece, said mount including a locking sleeve engaged with said transducer and formed with a spherical surface, and a locking nut formed with a mating spherical surface.

3. A device for maintaining a transducer of an ultrasonic flaw detection system in constant angular relationship with respect to a rapidly advancing longitudinal workpiece that is subject to deviations from strict axial travel, said device comprising a C-shaped carriage disposed under the workpiece and having upright extended portions, guide rollers rigidly connected to the upper ends of said extended portions and arranged to engage and move in accordance with said deviations of the workpiece, means for supporting said carriage while allowing movement of the carriage so that it follows all the deviations of the workpiece from strict axial travel, said means including a shaft extending transversely of the longitudinal axis of the workpiece, bearing means engaged with said shaft, and means allowing relative axial movement of said shaft and said bearing means to allow movement of said carriage so that it follows lateral deviations of the workpiece from strict axial travel, walls forming a receptacle connected to said carriage between said guide rollers and containing a liquid, said walls having means forming openings therein, the edges of said openings being adapted to engage the workpiece and permit partial submersion of a portion of the length of the workpiece, a transducer having a vibrating element submerged in the liquid in the receptacle and directed toward said workpiece to transmit and receive ultrasonic energy waves through said liquid into and out of the submerged portion of the workpiece, and an adjustable mount connected to one of the walls of said receptacle and adapted to hold the transducer at a predetermined angle with respect to the workpiece, said transducer being located intermediate the guide rollers with respect to the longitudinal axis of the workpiece so that the deviations of the workpiece from strict axial travel are most precisely transferred to the transducer to effect constant angularity therebetween.

4. A device for maintaining a transducer of an ultrasonic flaw detection system in constant angular relationship with respect to a rapidly advancing longitudinal workpiece that is subject to deviations from strict axial travel, said device comprising a carriage disposed under and arranged to engage and move in accordance with said deviations of the workpiece, means for supporting said carriage while allowing movement of the carriage so that it follows all the deviations of the workpiece from strict axial travel, said means including a vertical column adjacent said workpiece, a cantilever support member slidably engaged with said column, a shaft extending transversely of the longitudinal axis of the workpiece and interconnecting said cantilever support member and said carriage, bearing means engaged with said shaft, and means allowing relative axial movement of said shaft and said bearing means to allow movement of the carriage so that it follows lateral deviations of the workpiece from strict axial travel, a receptacle formed with side walls and connected to said carriage and containing a liquid, said walls having means forming openings therein, the edges of said openings being adapted to engage the workpiece and permit partial submersion of a portion of the length of the workpiece in said liquid, a transducer having a vibrating element submerged in the liquid in the receptacle and directed toward said workpiece to transmit and receive ultrasonic energy waves through said liquid into and out of the submerged portion of the workpiece, and an adjustable mount connected to one of said side walls and adapted to hold a transducer at a predetermined angle with respect to the workpiece.

References Cited by the Examiner
UNITED STATES PATENTS

| | | | |
|---|---|---|---|
| 2,795,133 | 6/57 | Ots | 73—67.7 |
| 2,940,305 | 6/60 | Williams et al. | 73—67.8 |

FOREIGN PATENTS

| | | |
|---|---|---|
| 139,138 | 6/60 | Russia. |
| 881,573 | 11/61 | Great Britain. |

RICHARD C. QUEISSER, *Primary Examiner.*
JOHN BEAUCHAMP, JOSEPH P. STRIZAK,
*Examiners.*